United States Patent [19]

Earle

[11] 4,249,120
[45] Feb. 3, 1981

[54] VARIABLE SPEED INDUCTION MOTOR CONTROL SYSTEM

[75] Inventor: Kent L. Earle, Woodbridge, Ill.

[73] Assignee: McGraw-Edison Co., Rolling Meadows, Ill.

[21] Appl. No.: 61,016

[22] Filed: Jul. 26, 1979

[51] Int. Cl.³ .............................................. H02P 7/36
[52] U.S. Cl. ................................... 318/729; 318/805; 318/808
[58] Field of Search ......... 318/729, 798, 805, 807–812

[56] References Cited

U.S. PATENT DOCUMENTS

| | | | |
|---|---|---|---|
| 3,441,823 | 4/1969 | Schlabach | 318/805 |
| 3,582,780 | 6/1971 | Hole | 324/83 A |
| 3,701,013 | 10/1972 | Gilmore | 324/83 D |
| 3,718,847 | 2/1973 | Graf et al. | 318/805 |
| 3,718,852 | 2/1973 | Bailey | |
| 3,748,556 | 7/1973 | Gillett | 318/729 |
| 3,909,687 | 9/1975 | Abbondanti | 318/805 |
| 4,052,648 | 10/1977 | Nola | 318/812 UX |
| 4,176,307 | 11/1979 | Parker | 318/798 |

FOREIGN PATENT DOCUMENTS 629618  8/1978  U.S.S.R. .................... 318/798

OTHER PUBLICATIONS

Efficiency Spurs Adjustable Frequency Drive Use, Fisher & Cota, Water and Waste Engineering, pp. 41–44, 64 (Oct. 1975).

*Primary Examiner*—Gene Z. Rubinson
*Attorney, Agent, or Firm*—Roy A. Ekstrand; Jon Carl Gealow; Ronald J. LaPorte

[57] ABSTRACT

A variable speed induction motor control system includes a variable voltage DC bridge coupled to a frequency controlled power inverter which in turn drives an induction motor. A motor power factor detecting circuit determines the relative voltage/current phase angle for the motor and derives a corresponding power factor error signal. The DC bridge and inverter respond to the power factor error signal to maintain the input power conditions of the motor at a near optimum efficiency. The power factor detecting circuit uses an exclusive OR gate to provide a pulse having a duration corresponding to the motor power factor which enables a counter during the pulse interval. After each pulse, the count which is indicative of the motor power factor, is applied to a holding circuit and converted to an analog error voltage.

5 Claims, 4 Drawing Figures

VARIABLE SPEED INDUCTION MOTOR CONTROL SYSTEM

BACKGROUND OF THE INVENTION

This invention relates generally to variable frequency electric motor systems and more particularly to those utilizing variable frequency induction motors.

There exist in many industrial and commercial applications a requirement for variable frequency or variable speed drive electric power systems. Typical applications are found in pumping systems, fans, textile agitators and textile dying devices. Initially, the increased use of electrical power to fulfill such needs resulted in application of the DC motor as the primary source of such variable frequency power. This was due primarily to the ease with which the speed and load characteristics of a DC motor are controlled. However, it has become apparent to practitioners in the art that several significant advantages favor AC motors rather than DC motors in such power systems. The smaller size and weight of AC motors for a given power requirement is particularly significant. Also, AC motors exhibit greater torque-to-inertia ratios (i.e. better speed of response) and better environmental compatibility. The latter results in a reduced need for enclosure in high humidity or chemical vapor environments. Frequently, DC motors with their inherently vulnerable brush contacts and commutators are incompatible with such environments and must therefore be enclosed. Finally, the excellent low speed characteristics of variable frequency AC motor systems often eliminate the need for costly reduction gear systems used in low speed DC motor drive systems.

These considerations as well as others have led practitioners in the art to develop variable frequency drive induction motor systems and while various different systems have been developed, most include the same basic elements. First, an AC-to-DC converter is used to change the available fixed-frequency AC main power to a DC voltage. Next, an inverter is used to reconvert the derived DC power to a variable frequency AC voltage. And finally, a frequency control is operatively coupled to the converter to change the frequency of AC power produced thereby which in turn varies the motor frequency.

The majority of motor controls developed tend to be either one of two types. The first, known by the names "square wave inverter", "constant flux" or "constant volts per Hz" system utilizes a control in which the output voltage of the DC converter and the frequency of the DC-to-AC inverter are varied in tandem. The second system is known as the "pulse width modulated system". The AC to DC conversion bridge in pulse width systems produces a fixed DC output voltage rather than the variable DC characteristic of constant flux systems. The inverter typically includes a "chopping circuit" generally comprising a plurality of SCR type devices which operate to chop or serrate the fixed DC voltage. Motor frequency control is achieved by varying the duty cycle of the chopping circuit and thereby the effective voltage applied to the DC-to-AC inverter system.

While these systems have thus far provided considerable improvement over the variable speed DC power systems, several problems in their operation have arisen. One source of several problems is the production of harmonics, or higher frequency, power components during the conversions of power from AC to DC and DC back to AC. This harmonic content in the generated power waveform causes increased $I^2R$ or heat losses as well as increased magnetic losses within the core and windings of the motor. These losses become of even greater concern in operations wherein low rotor speeds are utilized due to the reduced cooling wind produced at low rotor speeds. In critical operations, auxiliary cooling systems are utilized to carry off heat during low speed operation. These and other problems have produced an increased awareness of the need within the art to improve motor efficiency and thereby reduce the heat produced during motor operation.

One aspect of these heat problems arises due to the tendency of present variable speed systems to apply a maximum or near maximum power level to the motor under all load conditions. Variations of torque or load requirements are met by changes of motor power factor and slip angle in accordance with motor characteristics. This method of operation causes "over flexing", excessive heat production, and increased mechanical stresses on motor laminations. Practitioners in the art have recognized these limitations and have been led thereby to attempt development of systems which include motor power factor in the operational response of the system. However, thus far the need remains for a more efficient variable speed induction motor drive control system.

OBJECTS OF THE INVENTION

Accordingly, it is a general object of the present invention system to provide a more efficient variable frequency control system for an induction motor. It is a more particular object of the present invention to provide an improved variable frequency induction motor control system in which the applied power is controlled by the amount of loading or power requirement of the system.

SUMMARY OF THE INVENTION

In an induction motor power system of the type in which a source of substantially fixed-frequency alternating current electrical energy issued to supply an induction motor characterized by a power factor phase angle between motor voltage and current and in the operation of which it is desired to vary the operating speed and load requirements of the induction motor, variable frequency control means operative to maintain a substantially constant motor power factor notwithstanding changes of speed and load imposed comprise bridge means coupled to the source of substantially fixed-frequency alternating current electrical energy, converting the alternating current energy to direct current energy; inverter means, coupled to the bridge means, and the alternating current motor, converting the direct current output of the bridge means to alternating current energy; speed adjustment means coupled to the inverter, providing a coarse adjustment of inverter frequency in response to operator speed selection; power factor means, coupled to the motor, detecting the phase angle between the voltage and current of the motor and producing a power factor error signal indicative of the phase angle and independent of motor frequency; voltage means, coupled to the power factor means and the bridge means, changing the output voltage magnitude of the bridge means in response to the power factor error signal; and frequency means, coupled to the inverter means and the power factor means, changing the frequency of alternating current voltage applied to the motor to maintain a substantially constant power factor.

BRIEF DESCRIPTION OF THE DRAWINGS

The features of this invention which are believed to be novel are set forth with particularity in the appended claims. The invention, together with its further objects and the advantages thereof, may be best understood, however, by reference to the following description taken in conjunction with the accompanying drawings, in which like reference numerals identify like elements in the several figures and in which:

DESCRIPTION OF THE PREFERRED EMBODIMENT

Figure 1:
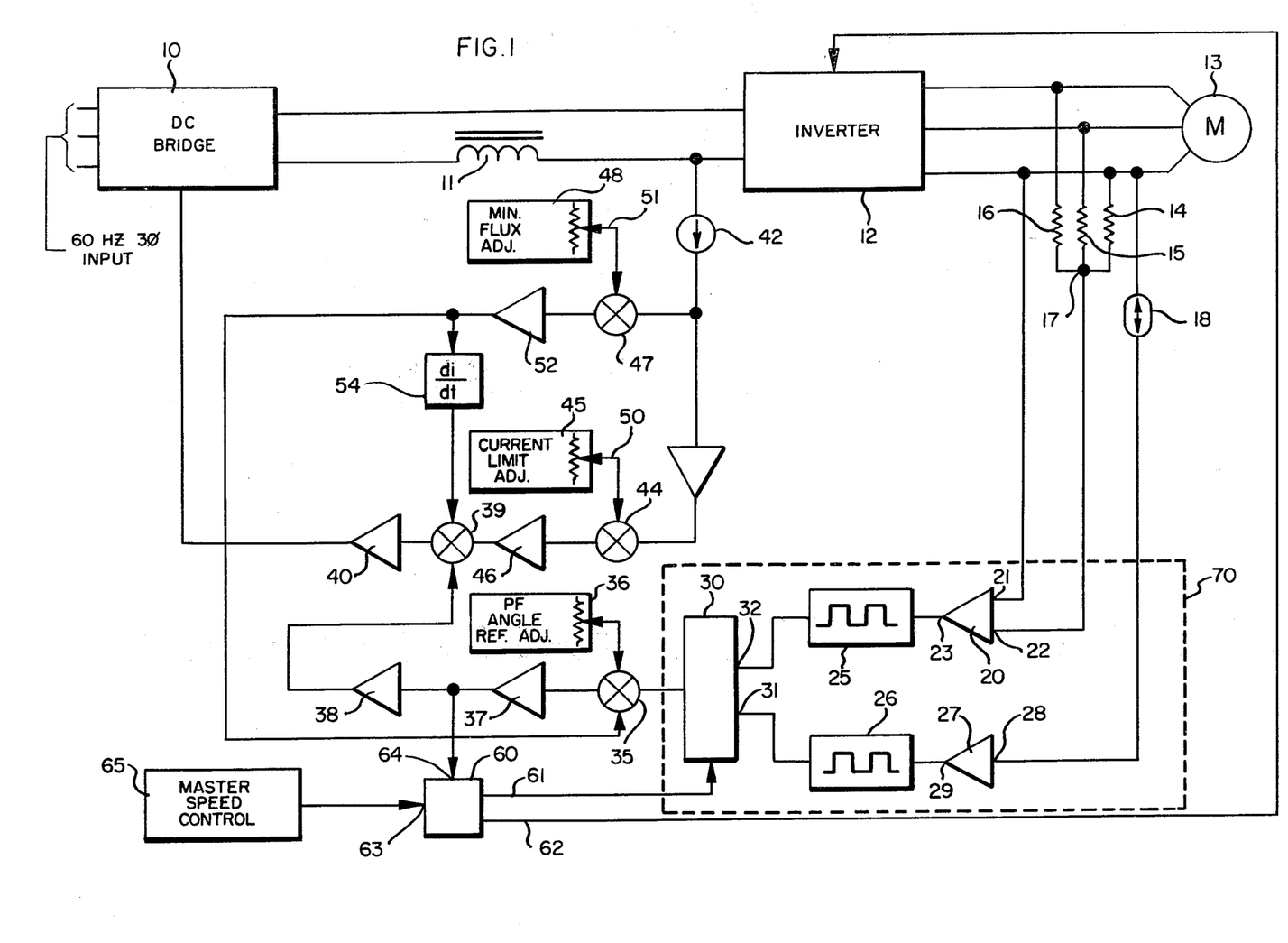
FIG. 1 is a block diagram representation of an induction motor control system constructed in accordance with the present invention.

FIG. 1 sets forth a block diagram of an induction motor control system constructed in accordance with the present invention. A conventional DC three-phase, full wave bridge 10 has its input coupled to a source of 60 Hz three-phase power and its output coupled to an inverter 12. A filter choke 11 is interposed between DC bridge 10 and inverter 12. The output of inverter 12 is coupled to a three-phase induction motor 13. A trio of equal value resistors 14, 15, and 16 are coupled between a common node 17 and respective ones of the phase voltage connections to motor 13. A filter 20 has an input terminal 21 connected to one phase of motor 13, an input terminal 22 connected to common node 17, and an output terminal 23 connected to the input of a zero crossing circuit 25. The output of zero-crossing circuit 25 is connected to an input terminal 32 of a phase angle comparator 30.

A Hall-effect device 18 derives a representative sample of the motor current for the same phase as the sampled voltage of motor 13. The current sample is coupled to terminal 28 of a filter 27. The output of filter 27 is connected to a zero crossing circuit 26 the output of which is coupled to the second input terminal 31 of phase comparator circuit 30. The output of the phase comparator circuit 30 is connected to one input of a summing network 35. A power factor angle reference adjustment 36 is coupled to a second input of summing network 35, and the output of summing network 35 is coupled to an amplifier 37, the output of which is coupled to an augmented integrating filter 38. The output of integrating filter 38 is coupled to one input of a summing network 39, the output of which is coupled to an amplifier 40 which in turn is coupled to the voltage control input of DC bridge 10. An inverter frequency control 60 which provides a source of reference clock signal, is coupled via terminal 62 to the frequency control input of inverter 12. Inverter control 60 also produces a frequency-multiplied signal derived from the same clock reference with inverter control 60 as the motor frequency signal which is coupled via terminal 61 to phase comparator 30. A master speed control 65 is coupled to inverter control 60 via a reference input terminal 63.

The DC input current coupled via filter 11 to inverter 12 is sampled by a second Hall-effect device 42 which in turn is coupled to an amplifier 43 and a summing network 47. A minimum flux adjustment circuit 48 is connected to the other input of summing network 47, the output of which is connected to amplifier 52. The output of amplifier 52 is coupled to a current differentiating circuit 54 and to an input terminal of summing network 35. The output of amplifier 43 is connected to one input of summing network 44, the other input of which is connected to a current limit adjustment circuit 45 and the output of which is connected to an amplifier 46. The output of amplifier 46 and differentiating circuit 54 are connected to respective input terminals of a summing network 39, the output of which is connected to the input of amplifier 40.

In operation, DC bridge 10 which should be understood to include a standard combination of 6 SCR devices in a three-phase full wave bridge configuration of the type well known in the art, converts the input 60 Hz three-phase AC voltage to a DC voltage of an amplitude controlled by the output of amplifier 40. The DC output of bridge 10 is filtered by coil 11 and is applied to the input terminals of inverter 12 providing a source of power. Standard circuit components within inverter 12 of the type and configuration well-known in the art convert the applied DC to variable frequency three-phase AC power which in turn is applied to motor 13. The frequency of the inverter output signal is controlled by the reference clock signal supplied by inverter frequency control 60 in a manner set forth below in greater detail.

The input voltage to amplifier 20, which as mentioned is representative of the selected phase alternating signal driving motor 13, is amplified by amplifier 20 to a level sufficient to drive zero-crossing network 25. The nonlinear operation of zero-crossing network 25 produces a square-wave signal in synchronism with the zero-crossing or polarity reversal points of the AC power signal. By similar function, the alternating current signal applied to input 28 of amplifier 27 is amplified to a level sufficient to drive a similar zero-crossing circuit 26 which operates in a nonlinear fashion to produce a second square-wave signal synchronized to the zero-crossing or polarity reversal points of the current waveform.

Figure 2:
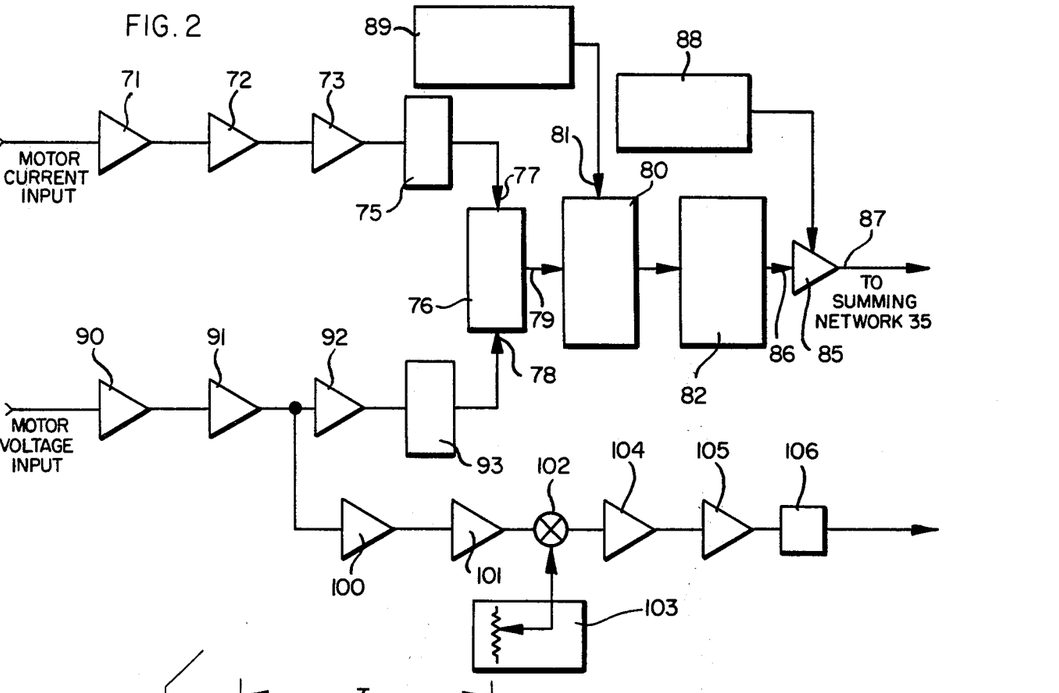
FIG. 2 is a block diagram representation of the power factor error signal producing portion of the present invention motor control system.

Phase comparator 30, which includes circuitry described in greater detail in conjunction with FIG. 2, performs a phase comparison of voltage and current zero-crossing signals and produces an output signal indicative of the phase relationship therebetween. This voltage/current phase indicative signal is added, within summing network 35, with an offset voltage produced by power factor angle reference adjustment 36 to produce a power factor error signal which is increased by amplifier 37 and filtered by integrating filter 38. The filtered output signal of filter 38 is combined with the output signals of differentiator 54 and amplifier 46, the functions of which will be described in greater detail below. For the present discussion it should be noted that the output signals of differentiator 54 and amplifier 46 do not under normal conditions contribute directly to the power factor error signal. Accordingly, the power factor error signal may for the present be considered to be coupled directly to bridge control signal amplifier 40. Bridge control amplifier 40 further processes the power factor error signal to a form suitable for application to DC bridge 10 whereby the output DC voltage thereof responds to the detected motor power factor.

The above-described performance of the present invention motor control provides continuous monitoring of the phase angle between applied motor current and voltage to derive a power factor error signal. Since the power factor error signal at the output of amplifier 37 is simultaneously coupled to DC bridge 10 and inverter frequency control circuit 60, there is provided dynamic, or continuous, adjustment and control of both voltage and frequency. For example, in the event a change of load is imposed upon motor 13, the phase angle between voltage and current within the motor changes. The change in power factor produces two simultaneous changes. First a change in error signal occurs which alters the applied voltage to the motor, by varying the output of bridge 10. Second, the clock frequency within control 60 adjusts the frequency of signal applied to motor 13.

Turning now to the previously mentioned current processing networks responsive to the current of DC bridge 10 which are detected by Hall-effect device 42, as shown in FIG. 1, the current from Hall-effect device 42 is simultaneously applied to summing network 47 and to the input terminal of amplifier 43. In the former, the current thus coupled is combined with a preset current produced by minimum flux adjustment 48. The sum of these two currents is applied to threshhold amplifier 52 which remains nonconductive unless the current applied thereto falls below a minimum established current level. This minimum established current corresponds to a predetermined minimum motor flux which must exist for proper operation of the motor. Should the current applied to amplifier 52 fall beneath the preset minimum, amplifier 52 conducts producing an auxiliary current which is simultaneously applied to summing network 35 and to differentiator 54. The portion of this auxiliary current applied to summing network 35 produces a starting motor flux in the event the motor has been stopped. This is necessary because when at a standstill the motor will not produce an input signal for the power factor angle measurement system and therefor no control current will be coupled to DC bridge 10. Also, in the event of a no load condition during motor operation, the power factor will decrease to a point at which substantially no power factor error signal is produced, which also causes the flux within the motor to decrease below the minimum motor flux.

The output of differentiator 54 is coupled to summing network 39 and provides another auxiliary current which is operative in the event of abrupt changes in motor loading. Under such transitional conditions, the change in motor flux or current is sensed and an auxiliary or supplemental current is provided to summing network 39 which assists the motor system in adjusting the output of bridge 10 to best respond to the change in load conditions.

Turning now to the operation of the current loop passings through amplifier 43, the output signal of amplifier 43 is combined by summing network 44 with a current limit signal developed by current limit adjustment 45. This combined signal is coupled to a second threshhold amplifier 46 which is of similar construction to that of amplifier 52. However, amplifier 46 is in a sense oppositely configured, that is, threshhold amplifier 46 remains nonconductive unless the input current thereto exceeds the predetermined maximum value. In other words, amplifier 46 conducts in the opposite sense to limit condition of motor current, that is when motor current exceeds a predetermined allowable maximum. When amplifier 46 conducts, it provides an auxiliary current which is coupled to summing network 39 where it is combined with the existing power-factor error signal to operate via bridge control 40 to appropriately change the DC bridge output. Since the operation of threshhold amplifier 46 responds to excessive motor current, the response of the DC bridge to the applied control signal from amplifier 46 acts to reduce bridge output and thereby reduce motor current below the predetermined maximum value.

FIG. 2 sets forth the circuitry within dashed line 70 of FIG. 1 in greater detail. The circuitry includes a pair of identical input channels for motor voltage and motor current signals of the selected phase. The current signal channel is formed by the series arrangement of an amplifier 71, a filter 72, a logarithmic amplifier 73, and a zero-crossing translator 75. The corresponding voltage signal channel is formed by the series combination of an amplifier 90, a filter 91, a logarithmic amplifier 92, and a zero-crossing translator 93.

The respective zero-crossing signals for current and voltage are coupled to a phase comparator 76, the output of which is coupled to the "enable" terminal of a counter 80. A system clock circuit 89 is coupled to the clock signal input of counter 80. The output of counter 80 is coupled to a memory 82, the output of which is coupled to the input terminal 86 of a digital-to-analog conversion circuit 85. A digital-to-analog converter reference voltage source 88 is also coupled to digital-to-analog converter 85. The output of converter 85 is connected to summing network 35 shown in FIG. 1.

FIG. 2 also shows circuitry responsive to the output signal of integrating filter 91 which is utilized to maintain an indication of rotor synchronization. Accordingly, the output of filter 91 is coupled to an amplifier 100, which in turn is coupled to a rectifying circuit 101. The latter also includes an output filter which is coupled to a summing network 102. A second input terminal of summing network 102 is coupled to a source of minimum voltage 103. The output of summing network 102 is applied to a comparator circuit 104, the output of which is applied to an integrating filter 105 which in turn is coupled to a limit detecting circuit 106. The output of limit detecting circuit 106 is coupled to other portions of the motor control circuit (not shown) in order to provide correction of motor frequency necessary to restore rotor synchronization if lost during operation.

In operation, the motor current signal of the selected phase is increased by amplifier 71 to a power level sufficient for application to integrating filter 72 which includes well-known circuitry having a low frequency pass filter characteristic. Accordingly, the higher frequency harmonics present in the motor current signal are attenuated while the fundamental motor current frequency signal is coupled substantially unattenuated to a logarithmic amplifier 73. As the name implies, the amplification characteristics of logarithmic amplifier 73 are substantially nonlinear to the extent that the output signal thereof is a square wave type signal having zero crossing or polarity reversal points which correspond to the zero-crossing points of the originally applied sinusoidal motor current signal. Because the signal thus produced is of alternating polarity, it is not suitable for application to the digital circuitry within phase comparator 76. Therefore, the output of amplifier 73 is translated or converted to a single polarity signal by translator 75 by combining the zero-crossing signal with a suitable amplitude DC offset signal. The translated output signal of circuit 75 is then applied to one input of phase comparator 76.

As mentioned, the motor voltage signal is processed by a signal channel which is identical to that processing the motor current signal. Accordingly, the motor voltage signal is increased by amplifier 90 to a power level sufficient to drive integrating filter 91 which being of similar construction to integrating filter 72 passes the fundamental frequency signal of motor voltage substantially unattenuated to logarithmic amplifier 92 which in similiar function to logarithmic amplifier 73 converts the applied sinusoidal voltage signal to a square-wave type signal having zero crossing points corresponding to the zero-crossing points of the original motor terminal voltage signal. Again, as with the current signal, a conversion to a single polarity signal is required in the voltage processing channel before application to phase comparator 76. Therefore, translating circuit 93 combines the zero-crossing motor voltage signal with a DC voltage of sufficient amplitude to produce a single polarity square wave. This translated zero-crossing signal is coupled to input terminal 78 of phase comparator 76.

Phase comparator 76 performs the logic function known as an exclusive OR gate in which an output signal or logic "high" is present at terminal 79 only during those intervals when an input signal "high" exists at one of input signal terminals 76 or 78. During those periods when input signal highs are simultaneously present at both terminals 76 and 78, no output signal high appears at terminal 79. Also, during those intervals when input signal highs are not present at either terminal 76 or 78, no output signal high appears at terminal 79. As will be explained below in conjunction with FIG. 3, the duration of phase comparator output signal varies directly with phase angle. Counter 80 includes well-known digital processing circuitry shown in greater detail in FIG. 4 in which a succession, or train, of clock signals produced by system clock 89 and applied to input terminal 81 are counted or accumulated within counter 80. As will be described below in greater detail, counter 80 responds to or "counts" clock signals from system clock 89 only during those intervals when an "enable" signal is applied to the counter. This enable signal is derived using the output of phase comparator 76.

In other words, system clock 89 is continuously running and applies a steady train of clock signals to input terminal 81 of counter 80. However, such signals are not accumulated and do not contribute to the count compiled within counter 80 except during those periods in which the enable signal, that is, the output signal of phase comparator 76, is applied to the counter. It should be recalled at this point that the output signal of comparator 76 is present only during those periods when one input signal is applied to one of terminals 77 or 78. As a result, an output signal is produced at terminal 79 only during those portions of the cycle which correspond to the phase difference between the voltage and current within motor 13.

Figure 3:
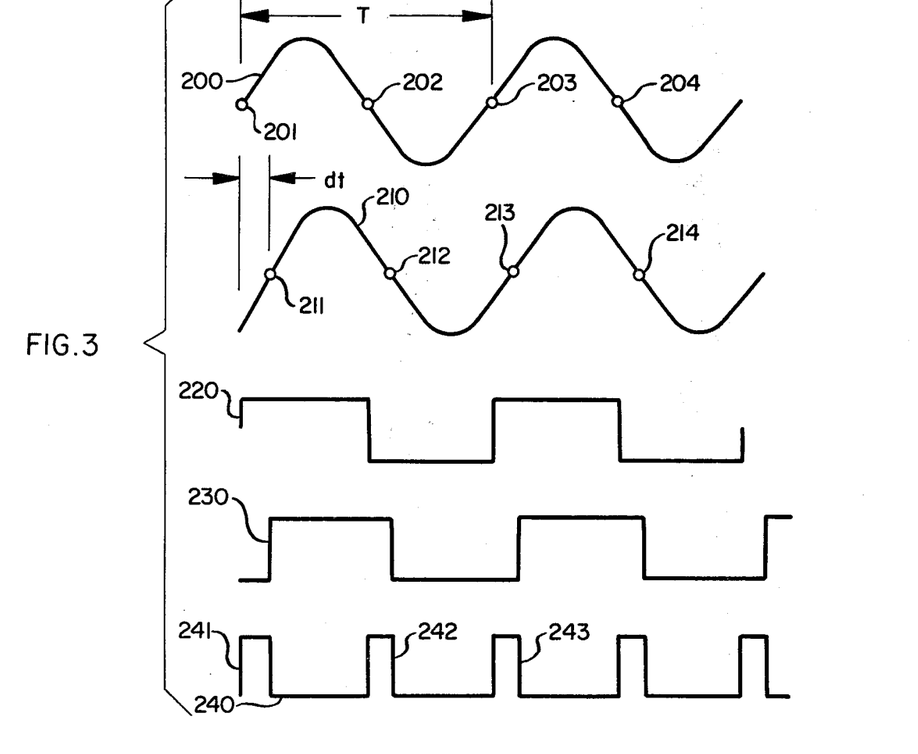
FIG. 3 is a group of graphs of voltage and current as a function of time representing several signals pertinent to the present invention motor control system.

Turning to the example set forth in FIG. 3 wherein curve 200 represents the sinusoidal voltage applied to motor 13, points 201, 202, 203 and 204 indicate the zero-crossing points. Curve 210 represents the sinusoidal current applied to motor 13 of which points 211, 212, 213, and 214 indicate the zero-crossing points. It should be noted that curves 200 and 210 are idealized in the sense that the waveforms are pure or harmonic free. This is for purposes of explanation, in reality of course the motor current and voltage signals do have harmonics and therefore are not perfect sinusoids. It would perhaps be more appropriate to consider curves 200 and 210 to comprise the filtered input signals to logarithmic amplifiers 73 and 92 respectively in FIG. 2. In the example shown, the voltage signal leads the current signal by an internal dt which corresponds to a portion of the total period T and is representative of a phase angle. By way of example, if T is 200 milliseconds (e.g. Freq=50 Hz) and dt is 10 milliseconds, then the phase angle between voltage and current is 10(360°)/200, or 18°. Curves 220 and 230 depict the resulting square-wave zero-crossing signals for voltage and current signals 200 and 210. These signals form the input signals to the OR gate within comparator 76. Curve 240 depicts the output of comparator 76 and it should be noted that it comprises two pulse signals 241 and 242 with the period T. Further, the duration of pulses 241 and 242 correspond to the phase difference between voltage and current signals 200 and 210.

Since the count within counter 80 is accumulated only during this phase difference interval, the accumulated signal or "count" within counter 80 is indicative of the portion of the motor cycle in which the current and voltage signals are not concurrent. More importantly, the count within counter 80 is also indicative of the relative phase angle between motor current and motor voltage. When the motor operates such that the voltage and current of motor 13 are substantially in phase, voltage and current zero-crossing signals 220 and 230 are substantially concurrent with relatively brief periods in which either input terminal 77 or 78 receives a signal exclusive of the other. As a result, the output signal at terminal 79 of comparator 76 curve 240 is of relatively short duration and accordingly the count accumulated within counter 80 during that cycle is relatively low. Conversely, when the motor operates such that the voltage-current phase angle is greater, the portion of motor voltage cycle during which voltage and current zero-crossing signals 220 and 230 are not simultaneous, is increased. Therefore, input terminals 77 and 78 of comparator 76 are singularly driven during extended portions of the motor voltage and current cycle and correspondingly the output signal at terminals 79 of comparator 76 comprises relatively long duration signals. This in turn will cause a greater number of clock signals produced by system clock 89 to be accumulated within counter 80 during each cycle of the motor voltage and current. Simply stated, during each cycle of the motor voltage and current signals, the number of clock signals accumulated or counted within counter 80 indicates that portion of the cycle in which a nonconcurrence of voltage and current signals exists. This in turn is a direct indication of the phase angle between the motor current and voltage. The accumulated count within counter 80 therefore, on a per cycle basis, is a direct indication of the phase angle separation between the voltage and current of motor 13, that is the motor power factor. During each cycle two complete counts are accumulated within counter 80, one for each comparator pulse, and each count is stored within memory 82. The stored count remains between pulses and is applied to digital-to-analog converter 85 with the result that the output voltage of converter 85 comprises an analog voltage having an amplitude proportional to the phase angle between voltage and current of motor 13. This analog voltage forms the power factor error signal which is applied to summing network 35 (shown in FIG. 1).

It should be noted at this point and will be explained in greater detail below, that the operation of phase comparator 76 is continuous, that is the zero-crossing signals for voltage and current of motor 13 are continuously applied to comparator 76. Accordingly, the output signal produced by comparator 76 through the exclusive OR gate function of the comparator, comprises a train of output pulses, two per voltage cycle, each having a width proportional to the phase difference between voltage and current. The operation of counter 80 and memory 82, however, is not continuous but rather is "refreshed" twice during each cycle of voltage and current of motor 13. That is, the count accumulated in counter 80 is updated or corrected by each comparator pulse. During the interval between pulses, the last previous count is stored within memory 82 and applied to converter 85. Therefore, the operation of the system shown in FIG. 2 is essentially a cycle-by-cycle derivation of a phase error signal which, for each successive cycle of voltage, is indicative of the power factor or voltage-current phase angle relationship which existed during the most previous cycle.

Figure 4:
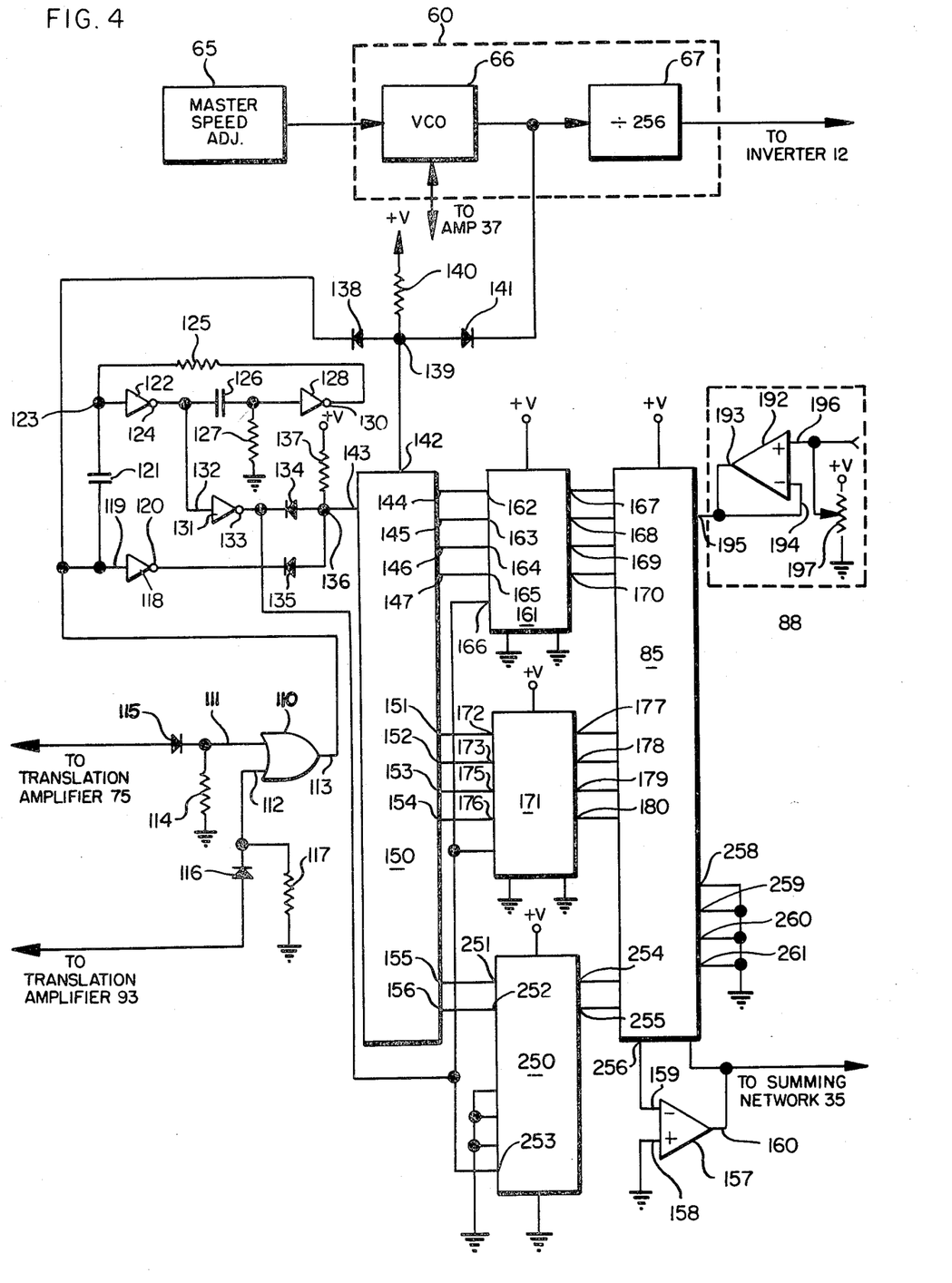
FIG. 4 is a detailed schematic of a portion of the present invention motor control system.

FIG. 4 shows the circuit structure of phase comparator 76, counter 80, memory 82 and digital-to-analog converter 85 in greater detail. An exclusive OR gate 110 has an input terminal 111 coupled to ground by a resistor 114, an input terminal 112 coupled to ground by a resistor 117 and an output terminal 113. A diode 115 has a cathode electrode coupled to input terminal 111 and an anode electrode coupled to translation amplifier 75. A diode 116 has a cathode electrode connected to input terminal 112 and an anode electrode coupled to translation amplifier 93. An inverting amplifier 118 has an input 119 connected to terminal 113 and an output terminal 120. An inverting amplifier 122 has an input terminal 123 coupled to output terminal 113 by a capacitor 121 and an output terminal 124. An inverting amplifier 128 has an input terminal 129 coupled to ground by a resistor 127 and to output terminal 124 by a capacitor 126. A resistor 125 is connected between input terminal 123 and output terminal 130. An inverting amplifier 131 has an input terminal 132 connected to output terminal 124 and an output terminal 133. A counter circuit 150 has a clock input terminal 142 connected to a source of positive supply voltage by resistor 140, a reset terminal 143 connected to a source of positive supply by a resistor 137, and a plurality of data output terminals 144–147 and 151–156. A diode 134 has an anode electrode connected to reset terminal 143 and a cathode electrode connected to output terminal 133. A diode 135 has an anode electrode connected to reset terminal 143 and a cathode electrode connected to output terminal 120. A diode 138 has an anode electrode connected to clock input terminal 142 and a cathode electrode connected to output terminal 113. A diode 141 has an anode electrode connected to clock input terminal 142 and a cathode electrode.

A voltage controlled oscillator 66 is coupled to amplifier 37 and master speed adjust control 65. The output of voltage controlled oscillator 66 is coupled to a frequency divider 67 and to the cathode electrode of diode 141. A memory 161 has a plurality of input terminals 162–165, respectively connected to terminals 144–147 of counter 150, an input enable terminal 166, and a plurality of data output terminals 167–170. A second memory 171 has a plurality of input terminals 172–175 connected to terminals 151–154 of counter 150, a data input enable terminal 176, and a plurality of data output terminals 177–180. A third memory 250 has a pair of input terminals 251 and 252 connected to output terminals 155 and 156, respectively, of counter 150, a data input enable terminal 253, and a pair of data output terminals 254 and 255.

A digital-to-analog converter 85 has a plurality of input terminals 182–185 connected to output terminals 167–170, respectively, of memory 161, a plurality of output terminals 186–189 connected respectively to output terminals 177–180 of memory 171, a pair of output terminals 190 and 191 connected respectively to output terminals 254 and 255 of memory 250, an output terminal 256, and a feedback input terminal 257, a plurality of terminals 258–261 connected to ground, and a reference input terminal 195. An amplifier 157 has an input terminal 159 connected to output terminal 256 of converter 85, an input terminal 158 connected to ground, and an output terminal 160 connected to feedback input terminal 257 of converter 85 and to summing network 35. An amplifier 192 has an input terminal 194 and an output terminal 133 both connected to reference input terminal 195 of converter 85, and an input terminal 196. An adjustable potentiometer 197 is connected to input terminal 196 of amplifier 192.

In operation, the zero-crossing voltage and current signals are applied via diodes 116 and 115 to input terminals 112 and 111 of exclusive OR gate 110 respectively. As described above, exclusive OR gate 110 produces an output pulse twice for each motor voltage and current cycle, the duration of which is indicative of or corresponds to the phase difference between the applied voltage and current zero-crossing signals. This variable duration pulse train is simultaneously coupled to inverting amplifier 120, differentiating capacitor 121 and diode 138. The signal coupled to amplifier 120 is inverted and gates diode 135 into conduction during the pulse interval. The pulse train coupled via capacitor 121 drives the configuration of inverting amplifiers 122 and 128 which in cooperation comprise a "one-shot" or nonstable multivibrator circuit characterized by the production of a single output pulse coincident with the trailing edge of the input pulses derived from phase comparator 110. These trailing edge output pulses are inverted by inverting amplifier 131 and applied to diode 134. The combination of diodes 134, 135 and resistor 137, cooperate to form a logic circuit known as an AND gate by which reset terminal 143 is controlled in order to cause counter 150 to accumulate clock signals only during the interval corresponding to the pulse occuring at the output of OR gate 110.

The output pulses from OR gate 110 drive a second pair of diodes 138 and 141 and a resistor 140 which in combination comprise a second AND gate operative upon clock signal input terminal 142 of counter 150. The second input signal for the AND gate thus formed is the master clock signal source produced by voltage controlled oscillator 66. Oscillator 66 is free running, that is it produces in a regenerative manner a succession of clock signals at a frequency controlled by signals from master speed adjustment 65 and the phase error voltage at the output of amplifier 37 (see FIG. 1). The output signals of oscillator 66 and the phase comparator signals derived from OR gate 110 when applied to the AND gate controlling the input of clock signals to terminal 142 of counter 150 cause clock signals to be counted or accumulated within counter 150 only during the periods of coincidence of clock signals and phase comparator output pulses.

The output signals of master clock 66 are also coupled to a frequency divider 67 which reduces the frequency of applied signals by a factor of 256 for application to the trigger control input of inverter 12. As is well-known, the 6 SCR construction of inverter 12 provides a frequency division by a factor of 6 between the applied frequency control signal and the three-phase AC power signal inverter output. As a result, the speed of motor 13 which responds to the output voltage of inverter 12 differs in frequency by a factor of 1536 (i.e. 256×6) from the basic clock signals applied to counter 150. This frequency relationship is maintained regardless of the basic frequency to which oscillator 66 is adjusted. In other words, for any change in oscillator frequency, a corresponding change in the motor frequency 13 is produced and a concurrent change in clock signal occurs all of which maintains the 1536 multiplication relationship clock signal frequency and motor voltage frequency. As a result each clock signal applied to counter 150 is for any frequency of adjustment indicative of 1 part in 1536 of the motor voltage driving signal period. This permits the achievement of a very basic advantage of the present invention system, that is, the phase angle measurement remains accurate over the entire range of motor speed adjustment. Therefore, the derived phase error voltage is independent of the frequency of the motor.

Once the count has accumulated within counter 150 during the duration of the output pulse from OR gate 110, the action of the AND gate, operative upon terminal 143, causes counter 150 to be reset, that is configured back to a zero count accumulation in preparation for the next output pulse from OR gate 110. Simultaneously however, the output signal of inverting amplifier 131 is coupled to memories 161, 171 and 250 and is operative to cause a transfer of the accumulated count within memory 150 into this group of memories. The count thus transferred is mantained within memories 161, 171 and 250 during the next succeeding interval between phase comparator pulses and the next phase comparator pulse interval. During this period the data temporarily stored in memories 161, 171 and 250 is applied to digital-to-analog converter 85. The analog voltage output of converter 85 at terminal 256 is the analog equivalent of the stored pulse count and is maintained during the entire interval between the trailing edge of the last applied phase comparator pulse and the reset action of the next phase comparator pulse. This analog voltage is amplified by amplifier 157 and is coupled to summing network 35 (shown in FIG. 1) and comprises the power factor error signal for the control system.

A current loop is operative between the output terminals 160 of amplifier 157 and the feedback input terminal 257 of digital-to-analog converter 85 for the device stability feedback requirements. In addition, the operation of the circuitry within digital-to-analog converter 85 requires the application of a fixed reference voltage at terminal 195. This fixed reference voltage is provided by a DC amplifier 192 which produces an output voltage for application to terminal 195 in accordance with the adjustment of a potentiometer 197.

As successive phase comparator pulses having a pulse duration equivalent to the phase angle between motor voltage and current are successively applied, counter 150 is enabled and accumulates a number of clock pulses, each of which corresponds to approximately one-quarter of one degree of phase angle regardless of frequency. At the termination of the phase comparator pulse, the counter action is terminated and the existing count is stored within the "scratch-pad" memory formed by memories 161, 171 and 250 which furnishes temporary storage and supply of the accumulated count to digital-to-analog converter 85 which in turn maintains a corresponding analog voltage for power factor error signal. The remainder of the circuit responds during the interval between successive counts of phase error pulse duration counting to this signal. This cycle continues on a two-pulse per motor voltage period basis and as the phase angle between voltage and current of motor 13 vary the pulse width of output signals from OR gate 110 vary correspondingly and the count of clock signals within counter 150 changes and through successive shifting of data causes a corresponding analog error voltage to be maintained at the output of amplifier 157.

As a result, under all conditions of frequency and load, the present invention system controls motor frequency and applied voltage independently to cause the motor to run at a power factor characteristic of full load. The change of load is accommodated by the change in voltage applied rather than power factor as in prior art systems. The advantage results in delivering only the power required to sustain the imposed motor load. This in turn reduces, under all conditions of load and frequency, the input power to the motor to the actual power needed and means a decrease in the magnetic and heat generated losses as well as the mechanical stresssr imposed.

While particular embodiments of the invention have been shown and described, it will be apparent to those skilled in the art that changes and modifications may be made without departing from the invention in its broader aspects, and, therefore the aim in the appended claims is to cover all such changes and modifications as fall within the true spirit and scope of the invention.

I claim:

1. In an induction motor power system of the type in which a source of substantially fixed-frequency alternating current energy is used to supply an induction motor characterized by a power factor phase angle between motor voltage and current and in the operation of which it is desired to vary the operating speed and load requirements of said induction motor, variable frequency control means operative to maintain a substantially constant motor power factor notwithstanding changes of speed and load imposed, said variable frequency control means comprising:

bridge means coupled to said source of substantially fixed-frequency alternating current electrical energy, converting said alternating current energy to direct current energy;

inverter means, coupled to said bridge means, and said alternating current motor, converting the direct current output of said bridge means to alternating current energy;

power factor means, coupled to said motor, detecting the phase angle between the voltage and current of said motor and producing a power factor error signal indicative of said phase angle independent of motor frequency;

voltage means, coupled to said power factor means and said bridge means changing the output voltage magnitude of said bridge means in response to said power factor error signal;

frequency means, coupled to said inverter means and said power factor means, changing the frequency of alternating current voltage applied to said motor to maintain said substantially constant power factor; and speed adjustment means coupled to said frequency means, providing a coarse adjustment of inverter frequency in response to operator speed selection.

2. Variable frequency control means as set forth in claim 1 wherein said power factor means include:

zero-crossing means responsive to said motor voltage and motor current signals producing a squared zero-crossing signal for said motor voltage and said motor current signals;

comparator means, coupled to said zero-crossing means, producing an output signal indicative of the phase angle between said motor voltage and said motor current; and pulse means, coupled to said comparator means, converting said comparator output signal to an analog error voltage.

3. Variable frequency control means as set forth in claim 2 wherein said comparator means include:

an exclusive OR gate, having a pair of input terminals coupled to said zero-crossing means, producing an output signal pulse when either one of said input signals is singularly present, the duration of said pulse being indicative of the portion of the total period of said motor voltage signal separating said motor voltage and current.

4. Variable frequency control means as set forth in claim 3 wherein said frequency means includes a source of clock signals having a substantially higher frequency than that of said motor voltage and current signals coupled to said data input terminal wherein said pulse means include:

a counter having a data input terminal, a reset/enable terminal and a plurality of data output terminals;

memory means, coupled to said plurality of data output terminals;

a digital-to-analog converter, coupled to said memory means, converting the stored count in said memory means to a corresponding magnitude analog signal; and enable/reset means, coupled to said counter reset/enable terminal and said exclusive OR gate, operative to cause said clock signals to be counted by said counter during said output signal of said exclusive OR gate and to shift the count so accumulated so said memory means at the termination of each pulse of said exclusive OR gate output signal.

5. Variable frequency control means as set forth in claim 4 wherein said source of clock signals includes a voltage controlled oscillator having an output signal frequency determined by the amplitude of control signal applied, and wherein said speed adjustment means include a source of variable control voltage coupled to said voltage controlled oscillator.

* * * * *